United States Patent
Kobayashi

(10) Patent No.: US 12,062,181 B2
(45) Date of Patent: Aug. 13, 2024

(54) IMAGE PROCESSING APPARATUS, IMAGE PROCESSING METHOD, AND STORAGE MEDIUM FOR EXTRACTING AN IRRADIATION FIELD OF A RADIOGRAPH

(71) Applicant: CANON KABUSHIKI KAISHA, Tokyo (JP)

(72) Inventor: Tsuyoshi Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 379 days.

(21) Appl. No.: 17/517,032

(22) Filed: Nov. 2, 2021

(65) Prior Publication Data
US 2022/0058423 A1  Feb. 24, 2022

Related U.S. Application Data

(63) Continuation of application No. 16/534,512, filed on Aug. 7, 2019, now Pat. No. 11,295,158.

(30) Foreign Application Priority Data

Aug. 14, 2018 (JP) ................................ 2018-152722

(51) Int. Cl.
*G06T 7/60* (2017.01)
*G06T 7/12* (2017.01)

(52) U.S. Cl.
CPC ................. *G06T 7/12* (2017.01); *G06T 7/60* (2013.01); *G06T 2207/10116* (2013.01); *G06T 2207/20076* (2013.01); *G06T 2207/20081* (2013.01)

(58) Field of Classification Search
CPC . G06V 10/44; G06T 7/60; G06T 2207/10116; G06T 2207/20076;
(Continued)

(56) References Cited

U.S. PATENT DOCUMENTS 5,828,775 A 10/1998 Takeo et al.
6,018,728 A * 1/2000 Spence ................. G06V 10/25
706/20

(Continued)

FOREIGN PATENT DOCUMENTS

CN 102711611 A 10/2012
JP H04261649 A 9/1992

(Continued)

OTHER PUBLICATIONS

Notice of Reasons for Refusal issued by the Japan Patent Office on Oct. 28, 2022 in corresponding JP Patent Application No. 2021-164291, with English translation.

(Continued)

*Primary Examiner* — Siamak Harandi
(74) *Attorney, Agent, or Firm* — Carter, DeLuca & Farrell LLP

(57) ABSTRACT

An image processing apparatus configured to extract an irradiation field from an image obtained through radiation imaging, comprises: an inference unit configured to obtain an irradiation field candidate in the image based on inference processing; a contour extracting unit configured to extract a contour of the irradiation field based on contour extraction processing performed on the irradiation field candidate; and a field extracting unit configured to extract the irradiation field based on the contour.

13 Claims, 6 Drawing Sheets

(58) Field of Classification Search
CPC . G06T 2207/20081; G06T 2207/20061; G06T 2207/20084; G06T 7/12; G06T 11/003; G06T 2207/10; G06T 7/0012; G06T 2207/10081; G06T 7/13; G06T 7/143; A61B 6/5211; A61B 6/06; A61B 6/54; A61B 6/5205; G06N 3/0427; G06N 3/08; G06N 5/04
See application file for complete search history.

(56) References Cited

U.S. PATENT DOCUMENTS

| | | | |
|---|---|---|---|
| 6,061,465 | A | 5/2000 | Nakajima |
| 9,813,647 | B2 | 11/2017 | Kobayashi |
| 9,979,911 | B2 | 5/2018 | Kobayashi |
| 2005/0169534 | A1 | 8/2005 | Takahashi |
| 2005/0254707 | A1 | 11/2005 | Takahashi |
| 2009/0238433 | A1 | 9/2009 | Rao |
| 2015/0116359 | A1 | 4/2015 | Kajita et al. |
| 2015/0187078 | A1 | 7/2015 | Matsumoto |
| 2017/0139487 | A1 | 5/2017 | Kimura et al. |

FOREIGN PATENT DOCUMENTS

| | | | |
|---|---|---|---|
| JP | H0538334 A | | 2/1993 |
| JP | H10-275213 A | | 10/1998 |
| JP | 2000506642 A | | 5/2000 |
| JP | 3239186 | * | 12/2001 |
| JP | 3239186 B2 | | 12/2001 |
| JP | 2002500795 A | | 1/2002 |
| JP | 2002-140714 A | | 5/2002 |
| JP | 2005129065 A | | 5/2005 |
| JP | 2005218581 A | | 8/2005 |
| JP | 2015123157 A | | 7/2015 |
| JP | 2018064627 A | | 4/2018 |
| JP | 2020501289 A | | 1/2020 |
| JP | 2020-025780 A | | 2/2020 |
| KR | 10-2006-0041700 A | | 5/2006 |
| KR | 10-1887194 B1 | | 8/2018 |
| WO | 9729437 A1 | | 8/1997 |
| WO | 9952068 A1 | | 10/1999 |
| WO | 2011080808 A1 | | 7/2011 |
| WO | 2017091833 A1 | | 6/2017 |
| WO | 2018101985 A1 | | 6/2018 |
| WO | 2018104682 A1 | | 6/2018 |

OTHER PUBLICATIONS

Chinese Office Action issued in corresponding CN Patent Application No. 201910720788.6, dated Feb. 14, 2023.
Request for Submission of an Opinion issued by the Korean Intellectual Property Office on Dec. 5, 2022 in corresponding KR Patent Application No. 10-2019-0097919, with English translation.
Chinese Office Action issued in corresponding CN Patent Application No. 201910720788.6, dated Feb. 14, 2023, with English language translation.
Notice of Reasons for Refusal issued by the Japan Patent Office on Feb. 18, 2022 in corresponding JP Patent Application No. 2018-152722, with English translation.
European Office Action issued in corresponding EP Patent Application No. 19189290.0, dated Aug. 2, 2023.
Examination Report issued by the Intellectual Property Office of India on Feb. 5, 2021 in corresponding IN Patent Application No. 201944031921, with English translation.
Extended European Search Report issued by the European Patent Office on Dec. 2, 2019 in corresponding European Patent Application No. 19189290.0.
Japanese Office Action dated Dec. 14, 2020, for Corresponding Japanese Application No. 2018-152722.
Japanese Office Action dated Jul. 27, 2020, for corresponding Japanese Application No. 2018-152722.
Office Action issued by the Federal Institute of Industrial Property of Russia on May 28, 2020 in corresponding RU Patent Application No. 2019124444, with English translation.
Zhao Liang et al: "Automatic Collimation Detection in Digital Radiographs with the Directed Hough Transform and Learning-Based Edge Detection", Jan. 8, 2016 (Jan. 8, 2016), International Conference on Financial Cryptography and Data Security; Lecture Notes in Computer Science; Springer, Berlin, Heidelberg, pp. 71-78, XP047332978, ISBN: 978-3-642-17318-9 [retrieved on Jan. 8, 2016].
Notice of Reasons for Refusal issued by the Japanese Patent Office on Jan. 15, 2024 in corresponding JP Patent Application No. 2023-076312, with English translation.

* cited by examiner

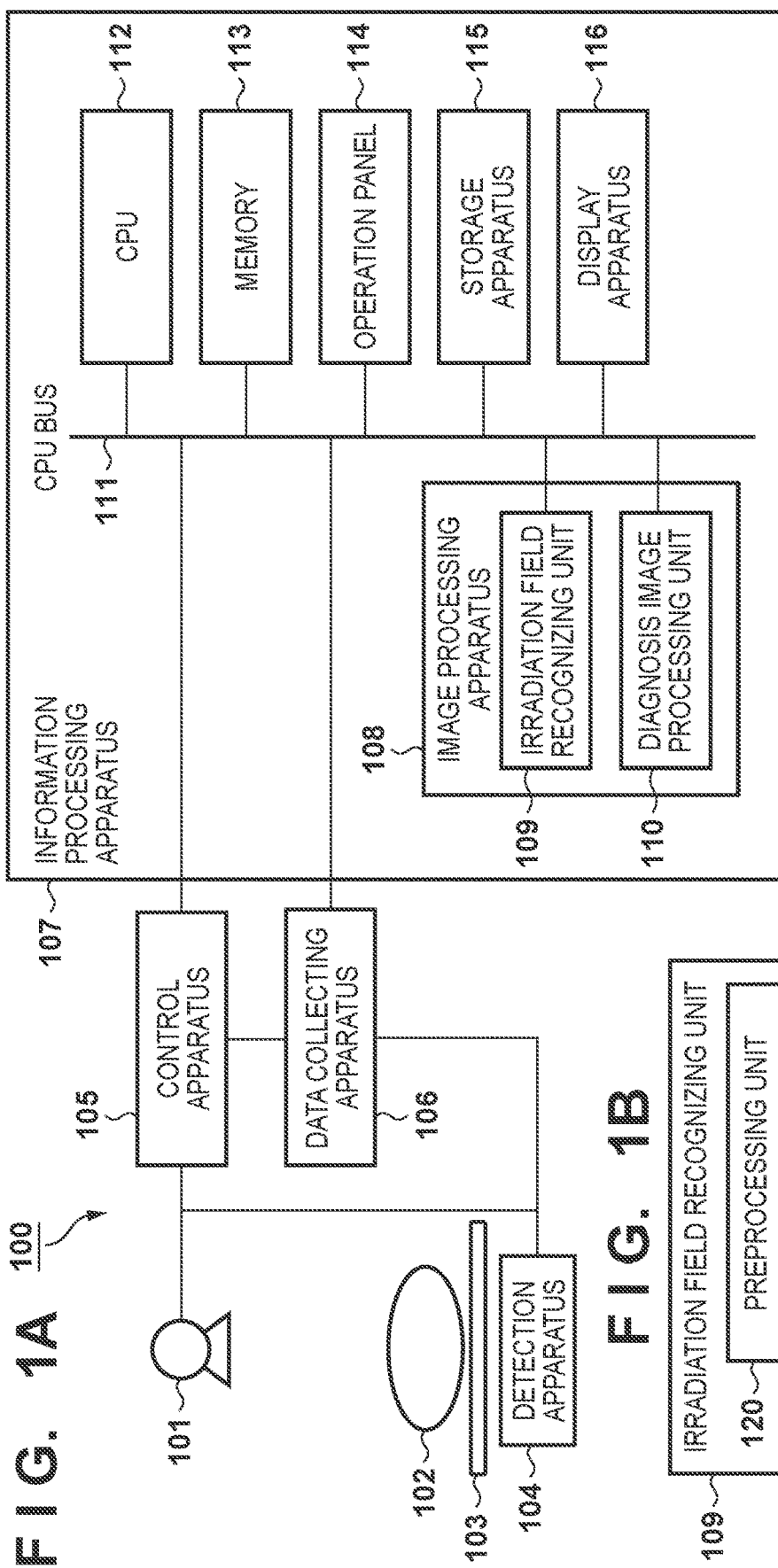

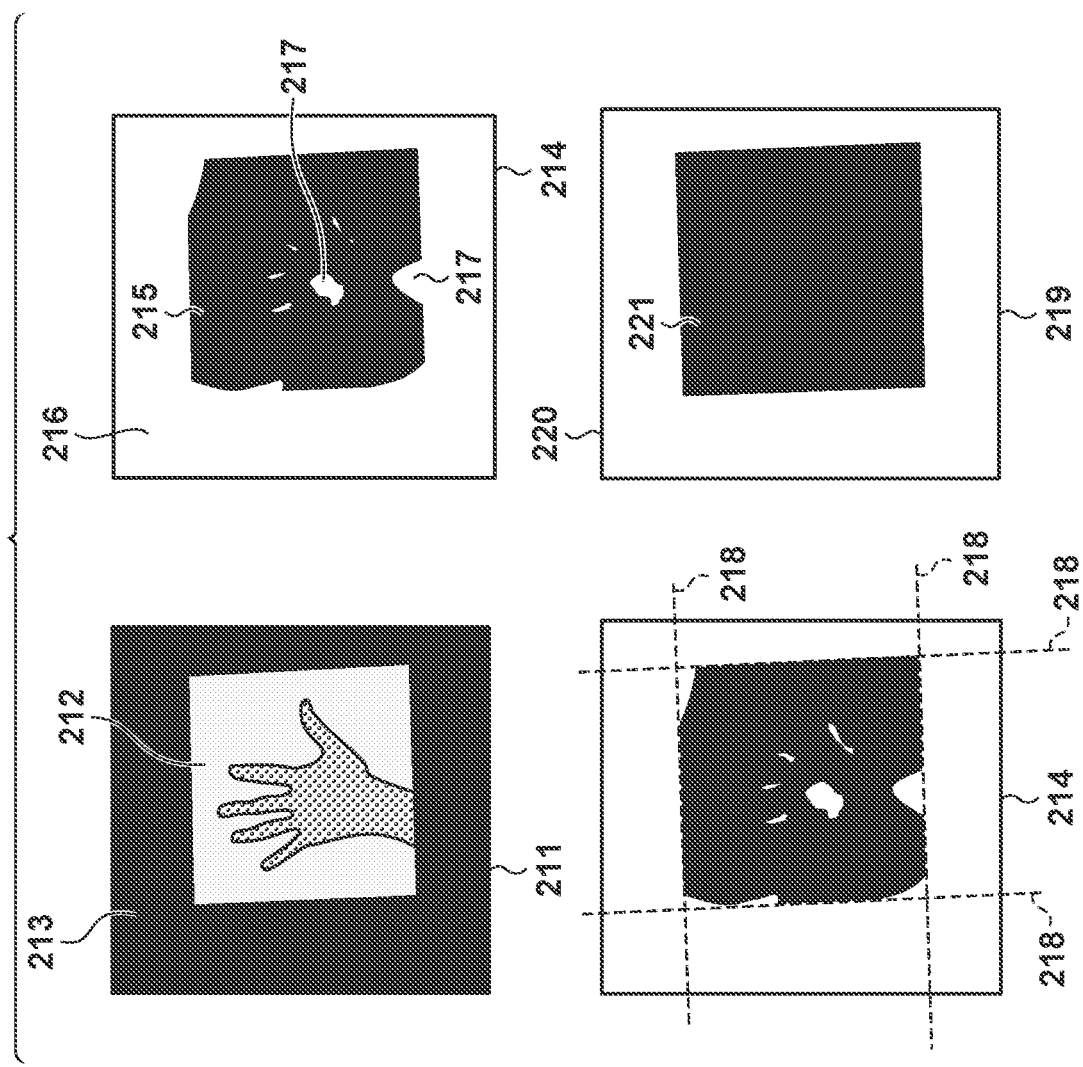

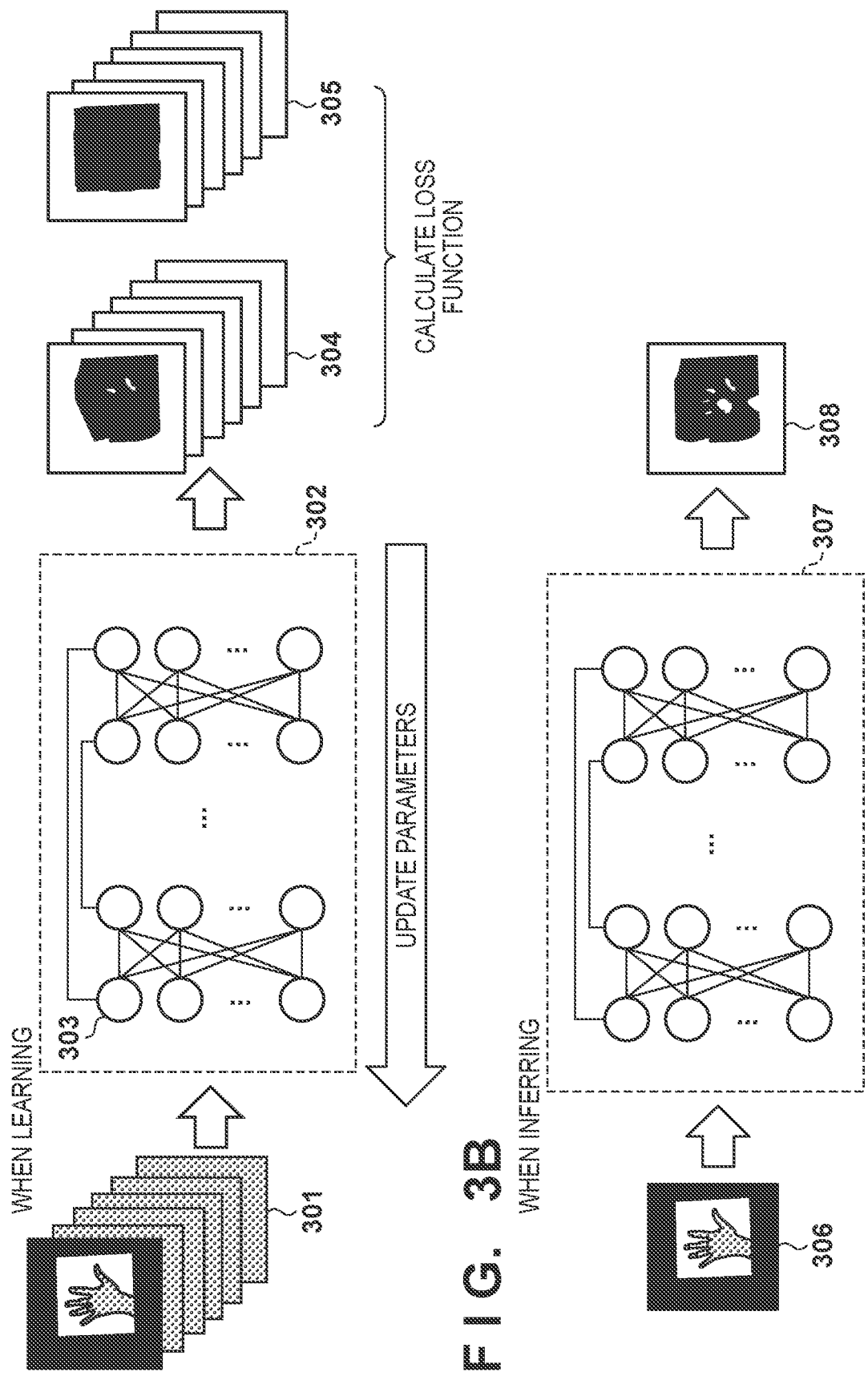

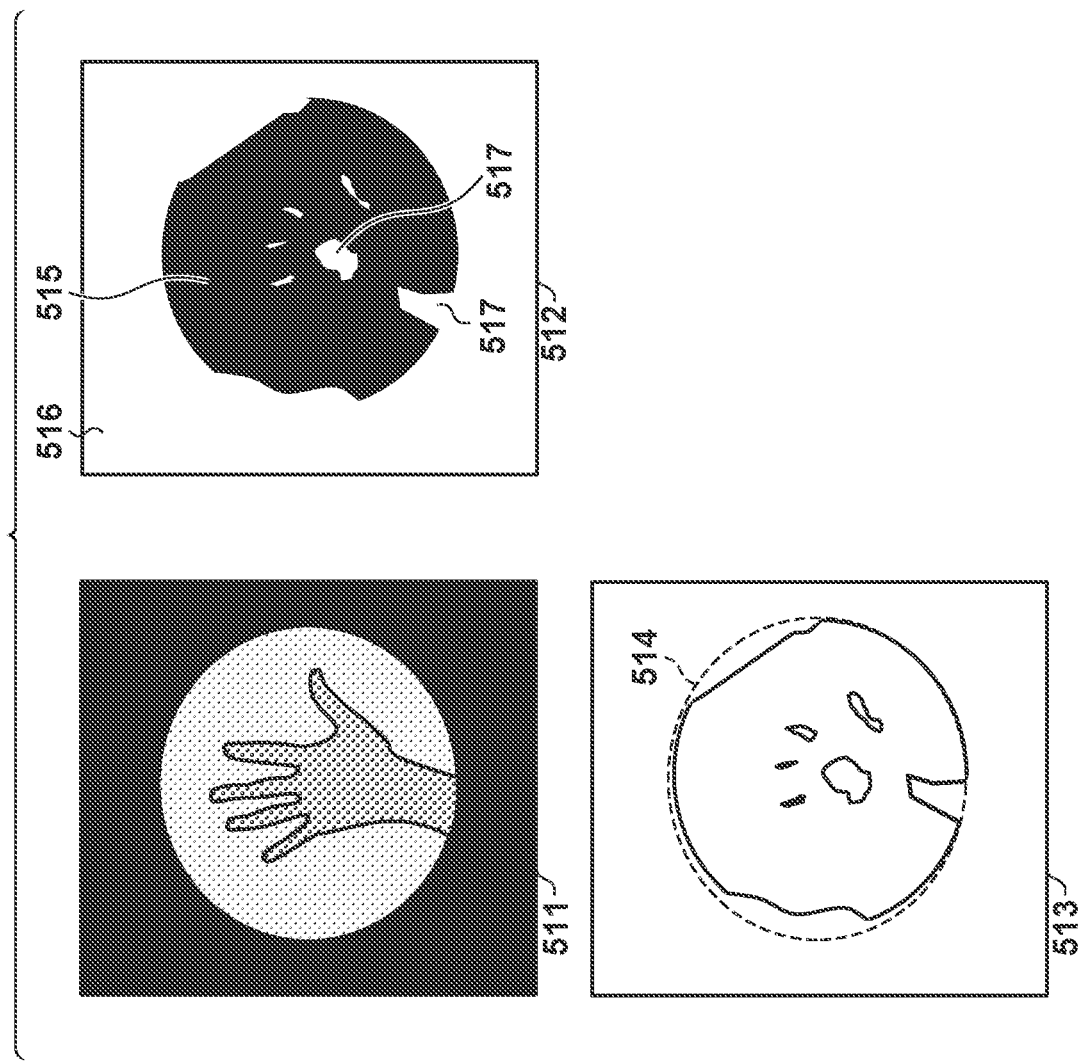
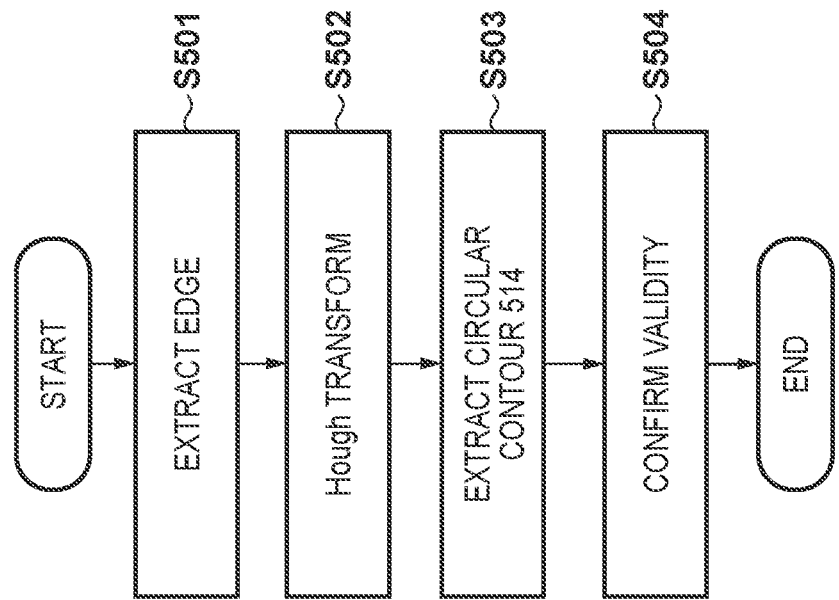

IMAGE PROCESSING APPARATUS, IMAGE PROCESSING METHOD, AND STORAGE MEDIUM FOR EXTRACTING AN IRRADIATION FIELD OF A RADIOGRAPH

CROSS REFERENCE TO RELATED APPLICATIONS

This application is a continuation of U.S. patent application Ser. No. 16/534,512, filed on Aug. 7, 2019, which claims the benefit of and priority to Japanese Patent Application No. 2018-152722, filed on Aug. 14, 2018, each of which is hereby incorporated by reference herein in their entirety.

BACKGROUND OF THE INVENTION

Field of the Invention

The present invention relates to an image processing apparatus, an image processing method, and a storage medium for extracting an irradiation field of a radiograph.

Description of the Related Art

In recent years, radiation imaging apparatuses have been widely used in medical settings, and radiographs are obtained as digital signals, subjected to image processing, and then displayed by a display apparatus and used to make a diagnosis.

In radiation imaging, irradiation of a region other than a field of interest (hereinafter referred to as an "irradiation field") that is necessary for diagnosis is usually prevented by narrowing down the irradiation field using a collimator in order to suppress the influence of radiation on a region other than the irradiation field, prevent scattering from the outside of the irradiation field, and prevent a reduction in contrast.

With regard to images obtained by narrowing down the irradiation field, in order to perform image processing on the irradiation field that is the field of interest in diagnosis, various types of technology have been proposed for extracting the irradiation field.

For example, Japanese Patent Laid-Open No. 2015-123157 proposes technology for extracting an irradiation field by obtaining a plurality of contours based on the edge intensity in an image and performing correctness determination. Also, Japanese Patent Laid-Open No. 04-261649 proposes technology for inputting image data to a neural network and outputting an irradiation field as a result.

However, a human body, which is the subject, may include a structure such as a bone, an implant, or the like that has a strong edge component and is difficult to distinguish from contours used for narrowing down the irradiation field, and there may be a case where the irradiation field cannot be recognized using the technology disclosed in Japanese Patent Laid-Open No. 2015-123157.

The technology disclosed in Japanese Patent Laid-Open No. 04-261649 enables determination of the irradiation field based on comprehensive features of a larger number of images using a neural network, but there may be a case where it is difficult to classify a region as the irradiation field using the neural network only.

The present invention was made in view of the above problems and provides image processing technology that enables extraction of an irradiation field.

SUMMARY OF THE INVENTION

According to one aspect of the present invention, there is provided an image processing apparatus configured to extract an irradiation field from an image obtained through radiation imaging, comprising: an inference unit configured to obtain an irradiation field candidate in the image based on inference processing; a contour extracting unit configured to extract a contour of the irradiation field based on contour extraction processing performed on the irradiation field candidate; and a field extracting unit configured to extract the irradiation field based on the contour.

According to another aspect of the present invention, there is provided an image processing method for extracting an irradiation field from an image obtained through radiation imaging, comprising: obtaining an irradiation field candidate in the image based on inference processing; extracting a contour of the irradiation field based on contour extraction processing performed on the irradiation field candidate; and extracting the irradiation field based on the contour.

According to the present invention, image processing technology that enables extraction of an irradiation field can be provided.

Further features of the present invention will become apparent from the following description of exemplary embodiments (with reference to the attached drawings).

BRIEF DESCRIPTION OF THE DRAWINGS

FIG. 1A is a block diagram showing an exemplary basic configuration of a radiation imaging system that includes an image processing apparatus according to an embodiment.

FIG. 1B is a block diagram illustrating an exemplary basic configuration of an irradiation field recognizing unit.

FIG. 2A is a flowchart illustrating the flow of processing performed by the irradiation field recognizing unit.

FIG. 2B is a schematic diagram showing images that are processed in processing performed by the irradiation field recognizing unit.

FIG. 3A is an illustrative diagram showing the concept of learning by a neural network.

FIG. 3B is an illustrative diagram showing the concept of inference by the neural network.

FIG. 5A is a flowchart illustrating the flow of contour extraction processing.

FIG. 5B is a schematic diagram showing images that are processed in the contour extraction processing.

DESCRIPTION OF THE EMBODIMENTS

Figure 4A:
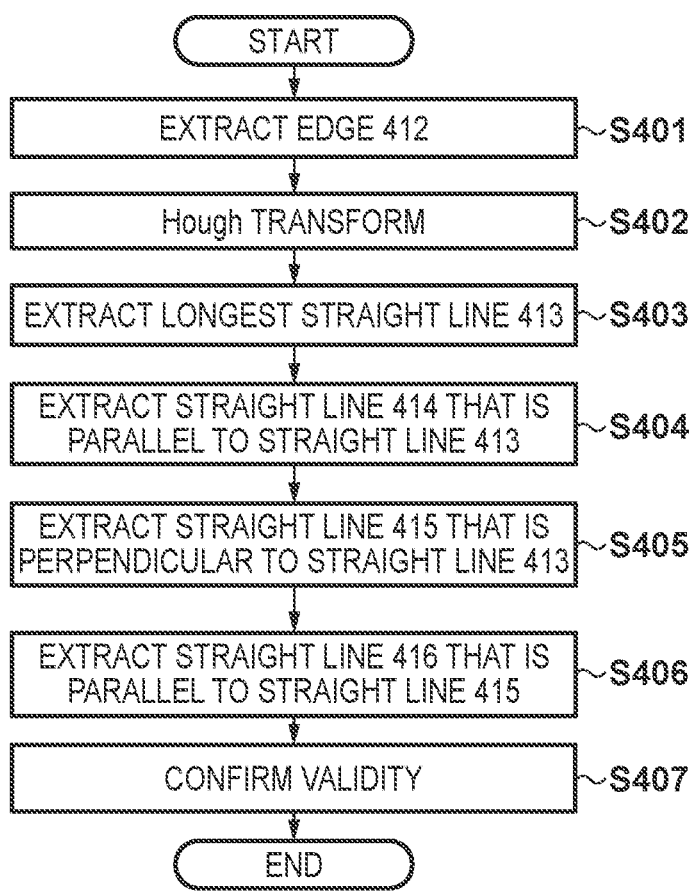
FIG. 4A is a flowchart illustrating the flow of contour extraction processing.

The following describes exemplary embodiments of the present invention in detail with reference to the drawings. It should be noted that radiation in the present invention includes not only commonly used X-rays but also α-rays, β-rays, γ-rays, and the like that are beams constituted by particles (including photons) that are emitted through radioactive decay, as well as beams (for example, particle beams and cosmic rays) that have substantially equivalent or higher levels of energy. The following describes an exemplary case where X-rays are used as radiation.

First Embodiment: Rectangular Collimator

First, an exemplary configuration of an image processing apparatus according to a first embodiment of the present invention will be described with reference to FIGS. 1A and 1B. FIG. 1A is a block diagram showing an exemplary basic configuration of a radiation imaging system that includes the image processing apparatus of the first embodiment.

A radiation imaging system 100 includes a radiation generating apparatus 101 that generates radiation, a bed 103 on which a subject 102 is arranged, a detection apparatus 104 (FPD) that detects radiation and outputs image data corresponding to radiation that has passed through the subject 102, a control apparatus 105 that controls radiation generation timing and radiation generation conditions of the radiation generating apparatus 101, a data collecting apparatus 106 that collects various types of digital data, and an information processing apparatus 107 that performs image processing and controls the entire apparatus according to instructions from a user. It should be noted that the configuration of the radiation imaging system 100 may also be referred to as a radiation imaging apparatus.

The information processing apparatus 107 includes an image processing apparatus 108 that includes an irradiation field recognizing unit 109 and a diagnosis image processing unit 110, a CPU 112, a memory 113, an operation panel 114, a storage apparatus 115, and a display apparatus 116, and these are electrically connected to each other via a CPU bus 111.

Various types of data and the like that are necessary for processing performed in the CPU 112 are stored in the memory 113, and the memory 113 includes a working memory that is used by the CPU 112. The CPU 112 is configured to control operations of the entire apparatus using the memory 113 according to instructions input by a user through the operation panel 114.

FIG. 1B is a block diagram showing an example of a basic functional configuration of the irradiation field recognizing unit 109 in the image processing apparatus of the first embodiment. The irradiation field recognizing unit 109 includes, as functional units, a preprocessing unit 120, an inference unit 121, a contour extracting unit 122, and a field extracting unit 123.

The radiation imaging system 100 starts an imaging sequence of the subject 102 according to an instruction given by a user through the operation panel 114. Radiation according to predetermined conditions is generated by the radiation generating apparatus 101, and the detection apparatus 104 is irradiated with radiation that has passed through the subject 102. Here, the control apparatus 105 controls the radiation generating apparatus 101 based on radiation generation conditions such as the voltage, current, irradiation period, and the like, and causes the radiation generating apparatus 101 to generate radiation under predetermined conditions.

The detection apparatus 104 detects radiation that has passed through the subject 102, converts the detected radiation into an electrical signal, and outputs the signal as image data that corresponds to the radiation. The image data output from the detection apparatus 104 is collected as digital image data by the data collecting apparatus 106. The data collecting apparatus 106 transfers the image data collected from the detection apparatus 104 to the information processing apparatus 107. In the information processing apparatus 107, the image data is transferred via the CPU bus 111 to the memory 113 under control performed by the CPU 112.

The image processing apparatus 108 applies various types of image processing to the image data stored in the memory 113 to extract an irradiation field from the image obtained through radiation imaging. After a subject region is extracted by the irradiation field recognizing unit 109, the diagnosis image processing unit 110 of the image processing apparatus 108 applies diagnosis image processing such as gradation processing, enhancement processing, or noise reduction processing to create an image that is suitable for diagnosis. The image processing apparatus 108 stores the result of processing performed by the diagnosis image processing unit 110 in the storage apparatus 115 and displays the result on the display apparatus 116.

Next, processing that is performed by the irradiation field recognizing unit 109 will be described with reference to FIGS. 2A and 2B. FIG. 2A is a flowchart showing the flow of processing that is performed by the irradiation field recognizing unit 109, and FIG. 2B is a schematic diagram showing examples of images that are processed in the processing performed by the irradiation field recognizing unit 109. The following describes an example in which a hand of the subject 102 is imaged using a rectangular collimator. However, the present invention is not limited by the imaged portion and the shape of the collimator described in the first embodiment, and can also be applied to other portions of the subject 102 such as the chest or abdomen, or any shape for narrowing down the irradiation field, such as a case where a circular collimator is used, for example.

In step S201, the preprocessing unit 120 performs pre-processing of an input image. Through this preprocessing, the input image is converted into a format with which subsequent inference processing that is performed using a neural network can be effectively performed. Here, the preprocessing unit 120 can convert the input image into an image of the same type as images that are used for learning by the inference unit 121, for example, learning by a neural network. As one example of the preprocessing performed by the preprocessing unit 120, the preprocessing unit 120 can perform grid removal processing, scattered ray reduction processing, noise reduction processing, logarithmic conversion processing, and normalization processing, and thereafter perform processing for scaling up or down to an image size that is suitable for a neural network that is used in the inference processing performed by the inference unit 121.

Although any image size can be employed, if the image input to the preprocessing unit 120 has an aspect ratio of 1:1 in length and width, such as 112×112 pixels or 224×224 pixels, for example, capability of generalization to rotation can be enhanced. Also, as one example of the normalization processing, the preprocessing unit 120 can normalize the signal level such that the signal of the input image is changed from 0 to 1. The preprocessing unit 120 obtains a preprocessed image 211 by executing the above processing. As shown in FIG. 2B, the preprocessed image 211 includes an irradiation field 212 and a collimator region 213 at a given ratio.

In step S202, the inference unit 121 obtains, based on inference processing, an irradiation field candidate in the image obtained through radiation imaging. The inference unit 121 performs the inference processing (for example, inference processing using a neural network) on the preprocessed image 211, which has been preprocessed, to obtain the irradiation field candidate from the image obtained through radiation imaging. The inference unit 121 performs the inference processing based on learning that is performed using a set of data that includes images obtained through radiation imaging as input and irradiation fields as output. The inference unit 121 performs the inference processing based on a result of learning that includes learning by a neural network. For example, the inference unit 121 can use a neural network that has performed learning in advance, as the neural network used in the inference processing. Details of learning by the neural network and the inference processing using the neural network will be described later. It should be noted that the inference processing is not limited to processing performed using a neural network, and the inference unit 121 can also use a processing unit that is created through machine learning performed using a support-vector machine or boosting, for example.

The inference unit 121 obtains, as the irradiation field candidate, a probability map 214 that indicates the probability of "being the irradiation field" or "not being the irradiation field (i.e., being the collimator region)" for each pixel of the input image. Here, the inference processing performed using a neural network uses a large amount of features that cannot be obtained by a person and enables determination of the irradiation field using comprehensive features of an image that are not limited to edge features, but it is sometimes difficult to classify a region as the irradiation field through this processing alone. For example, in the probability map 214 shown in FIG. 2B, a region 215 that is highly likely to be the irradiation field and a region 216 that is highly likely to be the collimator are obtained, but there may be a case where the probability map includes a misdetection region 217 that is actually not the collimator region but is determined as being the collimator region.

In step S203, the contour extracting unit 122 extracts contours of the irradiation field based on the irradiation field candidate. The contour extracting unit 122 extracts the contours of the irradiation field based on contour extraction processing performed on the irradiation field candidate. The contour extracting unit 122 performs the contour extraction processing on the probability map 214 (irradiation field candidate) obtained in step S202 by extracting contours 218 based on the shape of the collimator.

The contour extracting unit 122 performs the contour extraction processing on the irradiation field candidate by extracting contours based on the shape of the collimator. The contour extracting unit 122 changes the contour extraction processing according to the shape of the collimator. For example, the contour extracting unit 122 is capable of performing rectangular contour extraction processing when the shape of the collimator is rectangular and performing circular contour extraction processing when the shape of the collimator is circular. The contour extracting unit 122 is capable of selecting contour extraction processing for a rectangular shape of the collimator and contour extraction processing for a circular shape of the collimator.

In the first embodiment, it is assumed that the collimator (rectangular collimator) has a rectangular contour, and the contour extracting unit 122 extracts straight lines as contour candidates by performing rectangular contour extraction processing. That is, the contour extracting unit 122 performs contour extraction processing for obtaining, from the probability map 214, at most four straight lines as contour lines that constitute the contours of the collimator based on the rectangular shape of the collimator. Then, final contours are set based on validity confirmation processing that is performed on the extracted contour candidates. Details of this contour extraction processing will be described later.

In step S204, the field extracting unit 123 extracts the irradiation field based on the contours 218. Specifically, the field extracting unit 123 performs irradiation field extraction processing to obtain a divided region image 219 that is an image obtained by dividing the input image into an irradiation field 221 and a collimator region 220. Here, the field extracting unit 123 extracts a region inside the contours 218 as the irradiation field 221. The region inside the contours 218 is a region that is surrounded by the contours 218. That is, the field extracting unit 123 extracts a region surrounded by the contours 218 as the irradiation field 221 based on information regarding the contours 218 extracted in step S203, and extracts a region other than this region (i.e., region that is not surrounded by the contours 218) as the collimator region 220. Through the irradiation field extraction processing performed by the field extracting unit 123, the irradiation field 221 can be extracted with the misdetection region 217 included in the result of the inference processing performed using the neural network being eliminated.

It should be noted that the field extracting unit 123 can perform the irradiation field extraction processing by extracting the irradiation field based on a region in which an irradiation field that is presumed from the contours 218 overlaps with an irradiation field that is presumed from the probability map 214. That is, the field extracting unit 123 can extract, as the irradiation field, a region in which the ratio of overlap between the irradiation field presumed from the contours 218 and the irradiation field presumed from the probability map 214 is at least a set value. For example, the field extracting unit 123 can perform the irradiation field extraction processing based on information regarding the contours 218 (S203) and information regarding the probability map 214 (S202) by extracting, as the irradiation field 221, a region in which the ratio of overlap between a region that can be formed by the contours 218 and the region 215 that is highly likely to be the irradiation field in the probability map 214 is at least a predetermined reference value (for example, 75%).

Through the processing performed in above steps S201 to S204, the irradiation field recognizing unit 109 can extract the irradiation field with high accuracy.

Next, details of processing performed by the inference unit 121 will be described with reference to FIGS. 3A and 3B. FIG. 3A is an illustrative diagram showing the concept of learning by a neural network and FIG. 3B is an illustrative diagram showing the concept of inference by the neural network.

Learning by the neural network is performed using a set of input data 301 and a corresponding set of training data 305.

First, inference processing is performed on the set of input data 301 using a neural network 302 that is in the process of learning, to output a set of inference results 304. Next, a loss function is calculated from the set of inference results 304 and the set of training data 305. Any function such as a square error function or a cross entropy error function can be used as the loss function. Further, back propagation starting from the loss function is performed to update a parameter group of the neural network 302 in the process of learning. Learning by the neural network 302 in the process of learning can be advanced by repeating the above processing while changing the set of input data 301 and the set of training data 305.

Inference by the neural network is processing for applying inference processing that is performed using a learned neural network 307 to input data 306 and outputting an inference result 308.

In the first embodiment, the set of training data 305 is set such that, in the set of input data 301, the irradiation field is represented by 1 and the collimator region is represented by 0. The set of training data 305 may be created as appropriate through manual input or may be obtained by the irradiation field recognizing unit 109 from an outside source. Alternatively, the irradiation field recognizing unit 109 may automatically create standard training data according to the imaged portion.

Here, the neural network 302 has a structure in which a large number of processing units 303 are randomly connected to each other. Examples of the processing units 303 perform processing including convolution calculation, normalization processing such as batch normalization, and processing performed using an activation function such as ReLU or Sigmoid, and the processing units have parameter groups for describing content of processing. For example, a set of these processing units that perform processing in the order of, for example, convolution calculation, normalization, and an activation function are arranged in three to about a few hundred layers and are connected to each other, and can form a structure called a convolutional neural network or a recurrent neural network.

It should be noted that input and output of the neural network 302 take the form of an image that has been processed by the preprocessing unit 120. It is possible to employ a configuration in which an output image has the same resolution as an input image and indicates the probability of being the irradiation field for each pixel. In another example, the resolution of the output image may be set lower than that of the input image. In this case, the processing period of learning and inference can be reduced, but accuracy of the entire processing including subsequent processing may be reduced as a tradeoff.

Figure 4B:
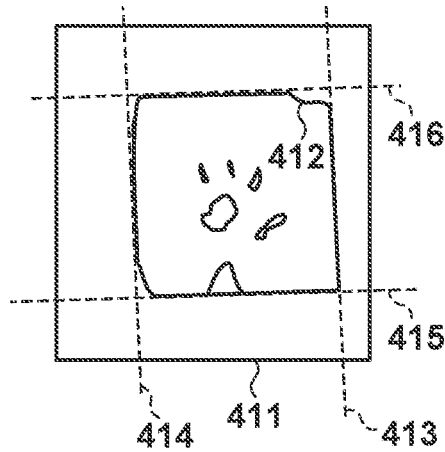
FIG. 4B is a schematic diagram showing an image that is processed in the contour extraction processing.
Figure 4C:
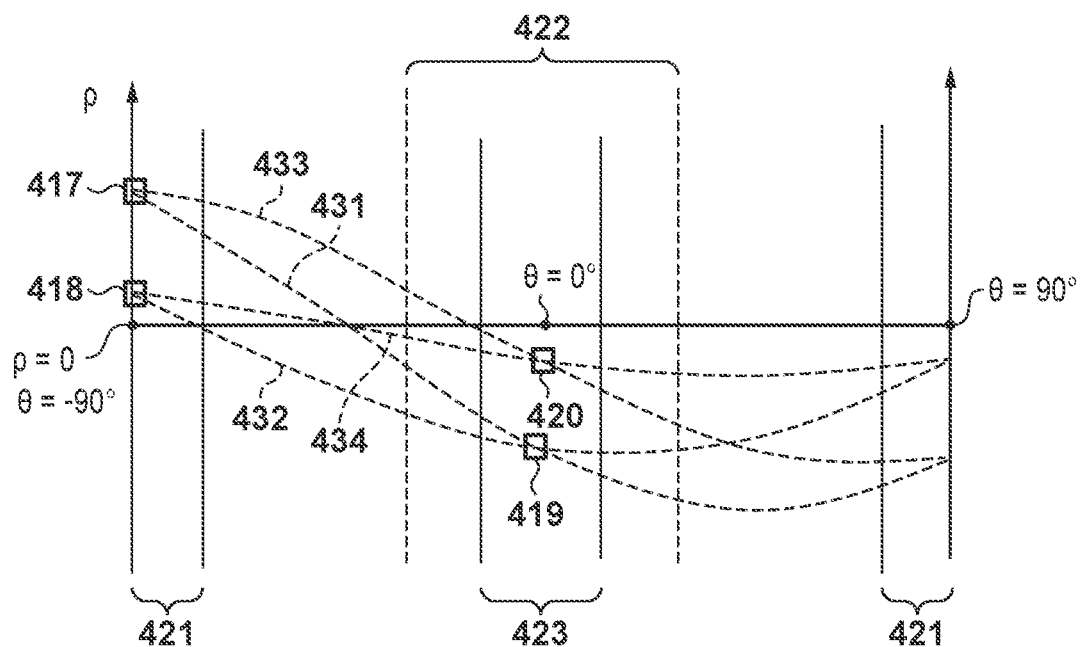
FIG. 4C is a diagram showing an example of transformation of an image into a polar coordinate space.

Next, details of the contour extraction processing performed by the contour extracting unit 122 will be described with reference to FIGS. 4A, 4B, and 4C. FIG. 4A is a flowchart showing the flow of the contour extraction processing, FIG. 4B is a schematic diagram showing an image that is processed in the contour extraction processing, and FIG. 4C is a diagram showing an example of transformation of an image into a polar coordinate space. The contour extracting unit 122 extracts contours of the irradiation field from an image that is obtained from the probability map 214 and includes edges that indicate boundaries between the irradiation field and the collimator region.

In step S401, the contour extracting unit 122 extracts, from the probability map 214, edges that indicate boundaries between the region 215 that is highly likely to be the irradiation field and the region 216 that is highly likely to be the collimator. Although the method for extracting edges is not limited, edges can be extracted by applying a differential filter such as a sobel filter to the probability map 214, for example. Although a probability from 0 to 1 is set for each pixel of the probability map 214, it is also possible to perform binary coded processing based on a preset threshold value (for example, 0.5) and perform processing for extracting pixels having at least the threshold value in order to simplify edge extraction processing. Through the above processing, an image 411 including edges 412 that include boundaries between the irradiation field and the collimator region can be obtained.

In step S402, the contour extracting unit 122 applies the Hough transform to the image 411. Here, a point on the image 411 that is represented as (x, y) in a rectangular coordinate system is transformed into a polar coordinate space of angle θ and distance p using Formula 1. Here, θ is the angle between the x axis and a line that is drawn from the origin perpendicularly to a straight line that passes through (x, y) and ρ is the length of the line drawn from the origin perpendicularly to the straight line passing through (x, y). When transformation is performed in a range of −90°<θ≤90°, for example, distribution in the polar coordinate space is obtained as shown in FIG. 4C. Here, a pair (θ, ρ) that takes a local maximum value in the polar coordinate space indicates a high probability of existence of a straight line in the image in the rectangular coordinate system. Using this feature, contours of the rectangular collimator that has a linear structure can be easily extracted through application of the Hough transform.

$$\rho = x \cos \theta + y \sin \theta \qquad \text{Formula 1}$$

In step S403, the contour extracting unit 122 extracts the longest straight line 413 as a contour candidate from the image 411. In this step, the contour extracting unit 122 searches the entire polar coordinate space and extracts a straight line that is formed by a pair (θ, ρ) 417 that takes the maximum value in the polar coordinate space.

In step S404, the contour extracting unit 122 extracts a straight line 414 that is opposite and parallel to the straight line 413 as a contour candidate. Assuming that the collimator has a rectangular shape, it is thought that there is one side that extends in a direction parallel to another side. Based on this assumption, the contour extracting unit 122 searches the polar coordinate space for a local maximum value in a region 421 where θ is in a predetermined range with respect to the pair (θ, ρ) 417 that corresponds to the straight line 413. The range of θ can be set to about 5° to 15° relative to θ=−90° or about −(5° to 15°) relative to θ=90°. Thus, the contour extracting unit 122 can extract a pair (θ, ρ) 418 as a local maximum value other than the pair (θ, ρ) 417 and a straight line 414 corresponding to the pair 418.

In step S405, the contour extracting unit 122 extracts a straight line 415 that crosses and is perpendicular to the straight line 413 as a contour candidate. Assuming that the collimator has a rectangular shape, it is thought that there is one side that extends in a direction perpendicular to another side. Based on this assumption, the contour extracting unit 122 searches the polar coordinate space for a pair (θ, ρ) in a region 422 where θ is in a predetermined range in the polar coordinate space with respect to the pair (θ, ρ) 417 corresponding to the straight line 413. The search range can be set to any range that is about ±15° relative to θ=0° that has a phase difference of +90° from θ (=−90°) of the reference pair 417. Thus, the contour extracting unit 122 can extract a pair (θ, ρ) 419 as a point at which a waveform 431 passing through the pair (θ, ρ) 417 and a waveform 432 passing through the pair (θ, ρ) 418 cross each other, and a straight line 415 corresponding to the pair 419.

In step S406, the contour extracting unit 122 extracts straight line 416 that is opposite and parallel to the straight line 415 as a contour candidate. Similarly to step S404, the contour extracting unit 122 searches for a pair (θ, ρ) from a region 423 in the polar coordinate space to search for a side that extends in a direction parallel to the straight line 415. The region 423 used as the search range can be set narrower than the region 422 from which the pair (θ, ρ) 419 has been extracted. The contour extracting unit 122 extracts a pair (θ, ρ) 420 at which a waveform 433 passing through the pair (θ, ρ) 417 and a waveform 434 passing through the pair (θ, ρ) 418 cross each other, and a straight line 416 corresponding to the pair 420 from the region 423. It should be noted that, if a straight line is not found in any of steps S403 to S406, processing in that step can be skipped supposing that there is no straight line.

In step S407, the contour extracting unit 122 confirms whether the straight lines 413 to 416 that are contour candidates extracted in steps S403 to S406 are valid as contours of the irradiation field and the collimator region. For example, the contour extracting unit 122 can determine whether the extracted straight lines are longer than a predetermined length. Based on this determination, the contour extracting unit 122 extracts, out of the straight lines extracted as contour candidates, straight lines that are longer than the predetermined length as contours.

Alternatively, the contour extracting unit 122 can determine whether a region that is formed by the extracted straight lines overlaps and matches well with the region 215 that is highly likely to be the irradiation field in the probability map 214, for example, whether an overlap ratio that indicates the ratio of overlap between these regions is at least a threshold value. If the overlap ratio that indicates the ratio of overlap between the region based on the contour candidates (region based on the extracted straight lines 413 to 416) and an irradiation field presumed from the probability map 214 is at least a threshold value, the contour extracting unit 122 extracts the contour candidates (straight lines 413 to 416) as contours.

With regard to confirmation of validity of the contours, the contour extracting unit 122 can perform determination processing that matches features of the image obtained through radiation imaging, such as the imaged portion of the subject. If validity of a straight line is not confirmed in this step, the contour extracting unit 122 eliminates the straight line, performs another search as necessary, and outputs a group of remaining straight lines as final contours. Through the processing performed in above steps S401 to S407, the contour extracting unit 122 can extract contours with high accuracy.

According to the first embodiment, image processing technology can be provided with which an irradiation field can be accurately extracted even if the irradiation field includes a structure that has a strong edge component and is difficult to distinguish from contours used for narrowing down the irradiation field.

Second Embodiment: Circular Irradiation Field

Next, a second embodiment of the present invention will be described. In the second embodiment, an exemplary configuration of a case where a circular collimator is used for narrowing down the irradiation field will be described. Examples of configurations of the radiation imaging system 100 and the image processing apparatus are similar to those in the first embodiment. The second embodiment differs from the first embodiment in that the contour extracting unit 122 performs circular contour extraction processing, assuming the use of a circular collimator. In the second embodiment, the contour extracting unit 122 extracts a circle or an ellipse as a contour candidate by performing the circular contour extraction processing.

Details of the contour extraction processing performed by the contour extracting unit 122 will be described with reference to FIGS. 5A and 5B. FIG. 5A is a flowchart showing the flow of the contour extraction processing in the second embodiment and FIG. 5B is a schematic diagram showing images that are processed in the contour extraction processing in the second embodiment.

Assume that an image 511 that is obtained by narrowing down the irradiation field using a circular collimator is input to the irradiation field recognizing unit 109 and a probability map 512 is output by the inference unit 121. In the probability map 512, a region 515 that is highly likely to be the irradiation field and a region 516 that is highly likely to be the collimator are obtained, but there may be a case where the probability map includes a misdetection region 517 that is actually not the collimator region but is determined as being the collimator region.

In step S501, the contour extracting unit 122 obtains, from the probability map 512, an image 513 that includes edges that indicate boundaries between the region 515 that is highly likely to be the irradiation field and the region 516 that is highly likely to be the collimator. This processing is equivalent to step S401 in FIG. 4A.

In step S502, the contour extracting unit 122 applies the Hough transform to the image 513. Here, a point on the image 513 that is represented as (x, y) in a rectangular coordinate system is transformed into a three-dimensional Hough space of the center point (center X, center Y) and the radius r of a circle using Formula 2.

$$r^2=(x-\text{center}X)^2+(y-\text{center}Y)^2 \qquad \text{Formula 2}$$

Alternatively, assuming that the collimator has an elliptical contour, the contour extracting unit 122 can transform a point on the image 513 that is represented as (x, y) in a rectangular coordinate system into a four-dimensional Hough space of the center point (center X, center Y) of an ellipse and the major axis a and the minor axis b of the ellipse using Formula 3.

$$\frac{(x-\text{center}X)^2}{a^2}+\frac{(y-\text{center}Y)^2}{b^2}=1 \qquad \text{Formula 3}$$

In step S503, the contour extracting unit 122 extracts a circular contour 514 by selecting coordinates in the Hough space that correspond to the circular contour 514 from the result of the Hough transform.

In step S504, the contour extracting unit 122 confirms whether the circular contour 514 extracted in step S503 is valid as a contour of the irradiation field and the collimator region. For example, the contour extracting unit 122 can determine whether the position of center coordinates of the extracted circle (or ellipse) and its radius (or major axis and minor axis) are included in a predetermined range. For example, the contour extracting unit 122 extracts, as the contour, a circle that is extracted as a contour candidate and for which the position of center coordinates and the radius are included in a predetermined range. Alternatively, the contour extracting unit 122 extracts, as the contour, an ellipse that is extracted as a contour candidate and for which the position of center coordinates and the major axis and the minor axis are included in a predetermined range.

Alternatively, the contour extracting unit 122 can determine whether a region that is formed by the extracted circle (or ellipse) overlaps and matches well with the region 515 that is highly likely to be the irradiation field in the probability map 512, for example, whether an overlap ratio that indicates the ratio of overlap between these regions is at least a reference value. If the overlap ratio that indicates the ratio of overlap between a region based on the contour candidate (region based on the extracted circular contour 514) and an irradiation field presumed from the probability map 512 is at least a threshold value, the contour extracting unit 122 extracts the contour candidate (circular contour 514) as the contour.

With regard to confirmation of validity of the contour, the contour extracting unit 122 can perform determination processing that matches features of the image obtained through radiation imaging, such as the imaged portion of the subject.

Through the processing performed in above steps S501 to S504, the contour extracting unit 122 can extract contours with high accuracy, even when a circular collimator is used for narrowing down the irradiation field.

It should be noted that, if examples of rectangular collimators and examples of circular collimators (including elliptical collimators) are both included in the training data used in learning by the inference unit 121, the inference unit 121 can obtain the probability map 512 regardless of whether the collimator has a rectangular shape or a circular shape. Using these properties, a configuration may be employed in which, according to the shape of the obtained probability map, the most suitable contour extracting unit 122 can be selected from that for rectangular contours described in the first embodiment and that for circular contours described in the second embodiment.

For example, a configuration may be employed in which a user performs the selection through the operation panel 114 or a configuration may be employed in which the contour extracting unit 122 performs both processing for rectangular contours and processing for circular contours and the field extracting unit 123 automatically extracts, as the irradiation field 221, a region in which the ratio of overlap between a region formed by extracted contours and a region that is highly likely to be the irradiation field in the probability map is at least a predetermined reference value.

Third Embodiment: Learning Mechanism at User Site

Figure 6:
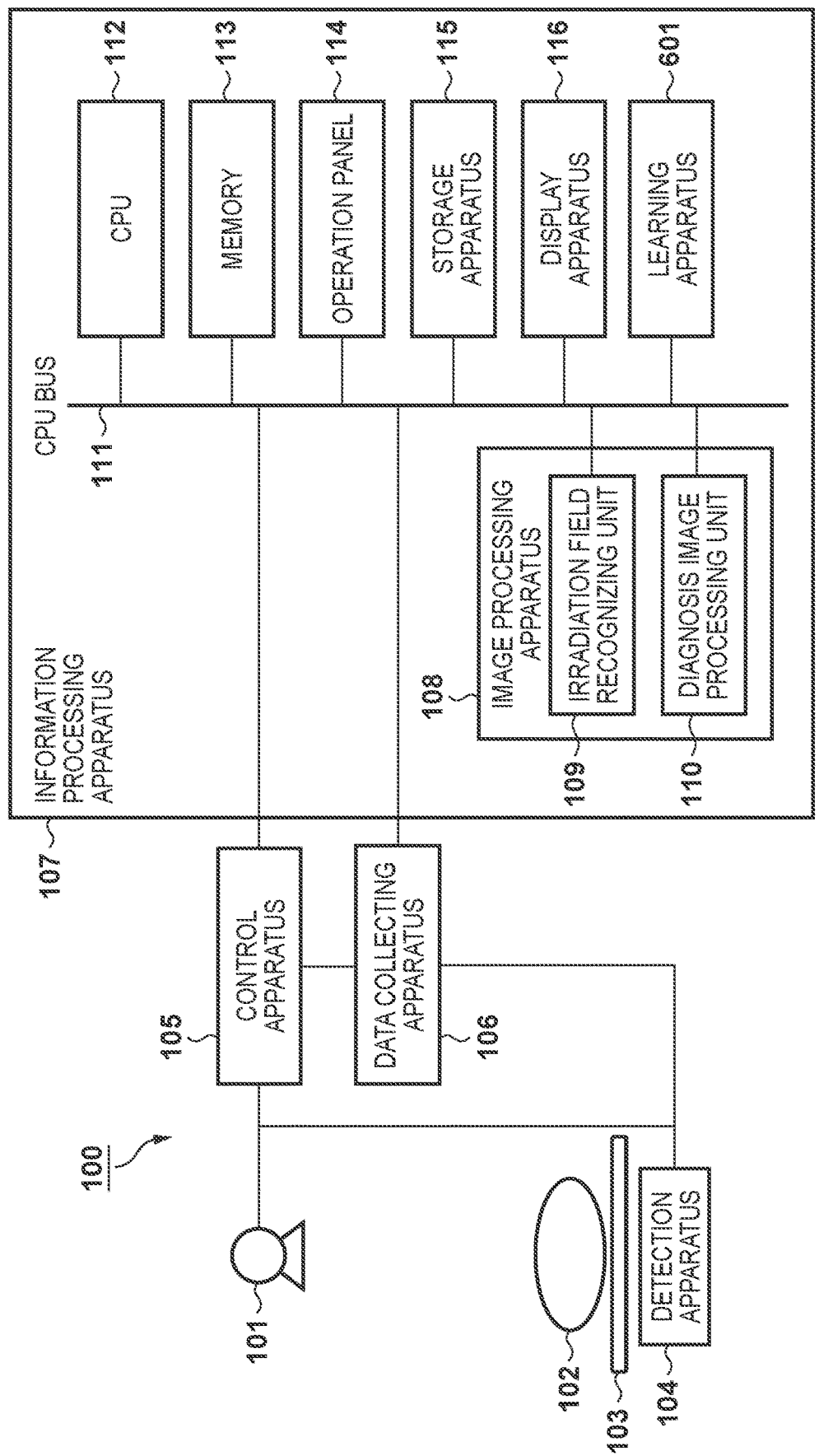
FIG. 6 is a block diagram showing an exemplary basic configuration of a radiation imaging system that includes an image processing apparatus according to an embodiment.

Next, a third embodiment will be described. FIG. 6 is a block diagram showing an exemplary basic configuration of a radiation imaging system that includes an image processing apparatus of the third embodiment. The configuration of the third embodiment differs from that of the first embodiment in that, in addition to the same elements as those in the first embodiment, a learning apparatus 601 is included in the information processing apparatus 107.

In the first and second embodiments, the radiation imaging system 100 is configured such that the inference unit 121 only performs inference processing using a neural network and learning by the neural network is performed in advance.

In the third embodiment, the radiation imaging system 100 is configured such that images that are obtained in the usage environment of the user and a set of datasets of the irradiation field are accumulated in the storage apparatus 115. As a result of the learning apparatus 601 being electrically connected to the CPU bus 111 in the information processing apparatus 107, learning processing can also be performed in the information processing apparatus 107 of the radiation imaging system 100. The inference unit 121 performs inference processing based on a result of learning to which the images obtained in the usage environment of the user and the set of datasets of the irradiation field are newly added and a result of learning performed in advance. Thus, additional learning processing using the learning apparatus 601 can be performed using the set of datasets stored in the storage apparatus 115 as new training data to update a parameter group in the inference unit 121. It should be noted that a calculation unit that has high parallel operation performance such as GPU can be used as the learning apparatus 601.

Any timing can be selected as the timing for performing the additional learning such as when at least a predetermined number of datasets that serve as new training data are accumulated in the storage apparatus 115 or at least a predetermined number of datasets that are obtained through modification of irradiation field recognition results by the user are accumulated. Also, transfer learning can be performed by setting a parameter group that was used prior to learning as default values of a parameter group of the neural network when additional learning is performed by the inference unit 121.

The storage apparatus 115 and the learning apparatus 601 do not necessarily have to be directly installed in the information processing apparatus 107, and may be provided on a cloud server that is connected to the information processing apparatus 107 via a network. In this case, datasets that are obtained by a plurality of radiation imaging systems 100 can be collected and stored on the cloud server and additional learning can also be performed using these datasets.

As described above, according to the third embodiment, image processing technology can be provided that not only achieves the effects of the first and second embodiments but also enables more accurate extraction of an irradiation field by optimizing irradiation field recognition processing so as to match the usage environment of the user.

Although some embodiments of the present invention have been described, it goes without saying that the present invention is not limited to those embodiments and can be carried out with various alterations and modifications within the scope of the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-152722, filed Aug. 14, 2018, which is hereby incorporated by reference herein in its entirety.

What is claimed is:

1. An image processing apparatus for processing an image obtained through radiation imaging, comprising:
at least one processor; and
at least one memory storing instructions that, when executed by the at least one processor, cause the at least one processor to function as:
a first obtaining unit configured to obtain an irradiation field candidate by inputting an image into a neural network learned using learning data which include information regarding an irradiation field in an image, the irradiation field candidate being a map regarding a pixel in the input image being the irradiation field or not being the irradiation field; and
a second obtaining unit configured to perform a determination regarding a contour of an irradiation field using a contour candidate of the irradiation field and the obtained irradiation field candidate and to obtain the irradiation field based on the determination, the contour candidate of the irradiation field being obtained using the obtained irradiation field candidate.

2. The image processing apparatus according to claim 1, wherein the second obtaining unit is configured to (a) obtain a contour of the irradiation field using the obtained irradiation field candidate and (b) obtain the irradiation field using the obtained contour.

3. The image processing apparatus according to claim 1, wherein the map indicates a probability of being the irradiation field or a probability of not being the irradiation field for a pixel of the image input into the neural network.

4. The image processing apparatus according to claim 1, further comprising a preprocessing unit configured to perform, on an image, at least one preprocessing of grid removal processing, scattered ray reduction processing, noise reduction processing, logarithmic conversion processing, and normalization processing; wherein the first obtaining unit obtains the irradiation field candidate by inputting the image preprocessed by the preprocessing unit into the neural network.

5. The image processing apparatus according to claim 1, wherein the second obtaining unit is configured to (a) obtain the contour candidate of the irradiation field using the obtained irradiation field candidate and information regarding a shape of a collimator, (b) perform the determination, (c) obtain the irradiation field using the contour of the irradiation field obtained based on the determination.

6. The image processing apparatus according to claim 5, wherein the determination is regarding whether the contour candidate of the irradiation field is valid as a contour of the irradiation field using the contour candidate of the irradiation field and the obtained irradiation field candidate.

7. The image processing apparatus according to claim 1, wherein the second obtaining unit is configured to (a) obtain a contour candidate of the irradiation field using the obtained irradiation field candidate and information regarding a shape of a collimator, (b) perform the determination, and
in a case where the contour candidate of the irradiation field is determined to be valid as the contour, (c) obtain the irradiation field using the contour candidate of the irradiation field as the contour.

8. The image processing apparatus according to claim 1, wherein the second obtaining unit is configured to (a) obtain a contour candidate of the irradiation field using the obtained irradiation field candidate and information regarding a shape of a collimator, (b) perform the determination, and
in a case where the contour candidate is determined to be valid as the contour, (c) obtain the irradiation field using the contour candidate as the contour, and
in a case where the contour candidate is not determined to be valid as the contour, (d) obtain the irradiation field using another contour candidate of the irradiation field as the contour.

9. The image processing apparatus according to claim 1, wherein the second obtaining unit is configured to (a) obtain a contour candidate of the irradiation field using the obtained irradiation field candidate and information regarding a shape of a collimator, (b) perform the determination to obtain a contour of the irradiation field based on a region of overlap between an irradiation field presumed from the contour candidate and an irradiation field presumed from the obtained irradiation field candidate, and (c) obtain the irradiation field using the contour.

10. The image processing apparatus according to claim 1, wherein the second obtaining unit is configured to (a) obtain a contour candidate of the irradiation field using the obtained irradiation field candidate and information regarding a shape of a collimator, (b) perform the determination to obtain the irradiation field using, as a contour of the irradiation field, a region in which a ratio of overlap between an irradiation field presumed from the contour candidate and an irradiation field presumed from the obtained irradiation field candidate is greater than a threshold.

11. The image processing apparatus according to claim 1, wherein the map is a map obtained by performing binary coded processing on a probability of being the irradiation field or not being the irradiation field for a pixel of the input two-dimensional image.

12. An image processing method for processing an image obtained through radiation imaging, comprising:
obtaining an irradiation field candidate by inputting an image into a neural network learned using learning data which include information regarding an irradiation field in an image, the irradiation field candidate being a map regarding a pixel in the input image being the irradiation field or not being the irradiation field;
performing a determination regarding a contour of an irradiation field using a contour candidate of the irradiation field and the obtained irradiation field candidate, the contour candidate of the irradiation field being obtained using the obtained irradiation field candidate; and
obtaining the irradiation field based on the determination.

13. A non-transitory computer-readable storage medium storing a program for causing a computer to execute the method according to claim 12.

* * * * *